United States Patent
Liao

(10) Patent No.: US 7,916,413 B2
(45) Date of Patent: *Mar. 29, 2011

(54) LENS ACTUATOR

(75) Inventor: Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 34 days.

This patent is subject to a terminal disclaimer.

(21) Appl. No.: 12/482,368

(22) Filed: Jun. 10, 2009

(65) Prior Publication Data

US 2010/0046099 A1    Feb. 25, 2010

(30) Foreign Application Priority Data

Aug. 20, 2008  (CN) .............. 2008 1 0304066

(51) Int. Cl.
*G02B 7/00* (2006.01)
(52) U.S. Cl. ........................ 359/824; 359/819
(58) Field of Classification Search ........... 359/819–828
See application file for complete search history.

(56) References Cited

U.S. PATENT DOCUMENTS

| 7,715,131 B2 * | 5/2010 | Chou et al. | 359/824 |
| 2008/0007850 A1 * | 1/2008 | Huang | 359/824 |
| 2008/0259468 A1 * | 10/2008 | Chung | 359/814 |
| 2010/0128372 A1 * | 5/2010 | Wang | 359/824 |
| 2010/0142066 A1 * | 6/2010 | Okabe et al. | 359/824 |

* cited by examiner

*Primary Examiner* — Darryl J Collins
(74) *Attorney, Agent, or Firm* — Raymond J. Chew

(57) ABSTRACT

An exemplary lens actuator includes a lens barrel, a coil wrapped around the lens barrel, a plurality of magnets, a bracket, and a first resilient plate. The lens barrel includes a main body and a plurality of first positioning pins protruding out from the main body. The first resilient plate includes an outer frame, an inner frame substantially coaxial with the outer frame, and a plurality of spring portions interconnected between the outer frame and the inner frame. A fixed panel is mounted on the first side of the bracket. The outer frame of the first resilient plate is fixed on one portion of the fixed panel. The inner frame of the first resilient plate is fixed on the lens barrel. The first positioning pins extend through the inner frame of the first resilient plate and resist on another portion of the fixed panel.

20 Claims, 6 Drawing Sheets

LENS ACTUATOR

CROSS REFERENCE TO RELATED APPLICATIONS

This application is related to commonly-assigned copending applications Ser. No. 12/192,376, entitled "RESILIENT PLATE AND LENS ACTUATOR WITH SAME", Ser. No. 12/327,658, entitled "RESILIENT PLATE FOR LENS ACTUATOR", and Ser. No. 12/341,348, entitled "LENS ACTUATOR". Disclosures of the above-identified applications are incorporated herein by reference in its entirety.

BACKGROUND

1. Technical Field

The present disclosure relates to lens actuators, and particularly, to a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, a lens actuator is desirable to overcome the above-described deficiencies.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
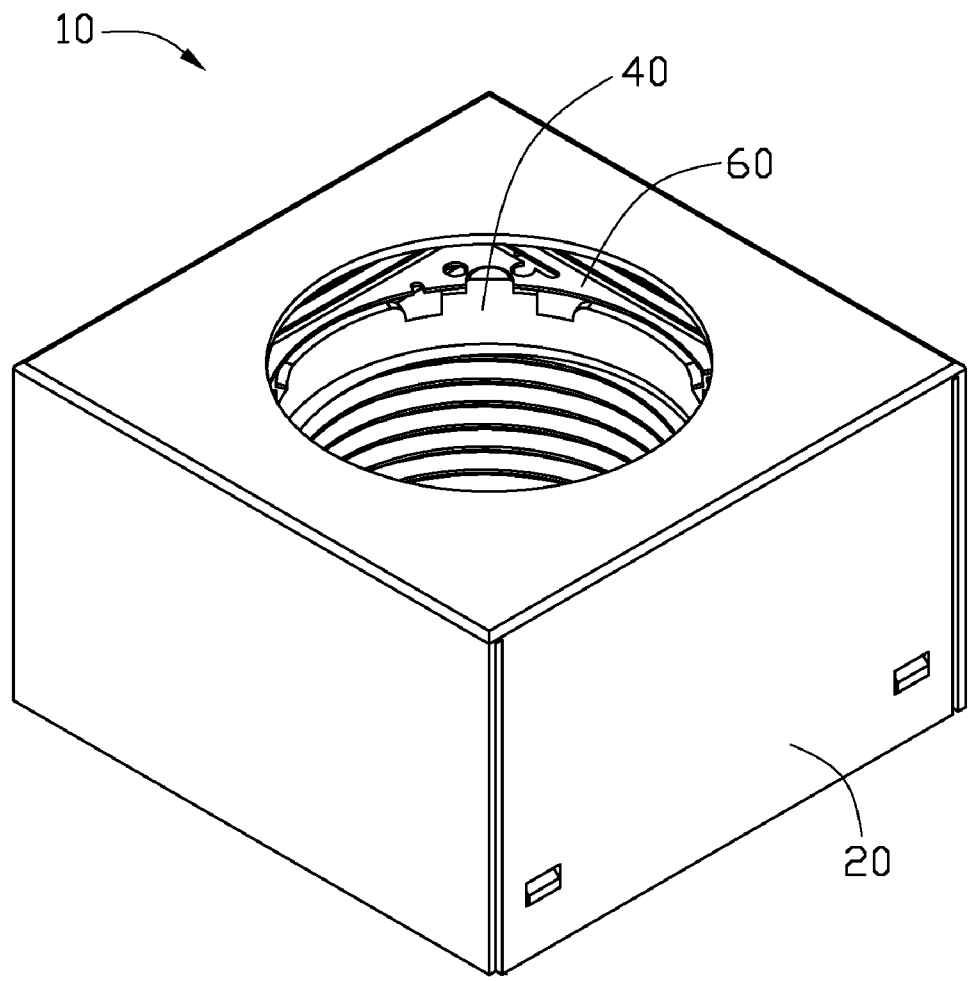
FIG. 1 is a schematic, isometric view of a lens actuator according to a first embodiment.
Figure 2:
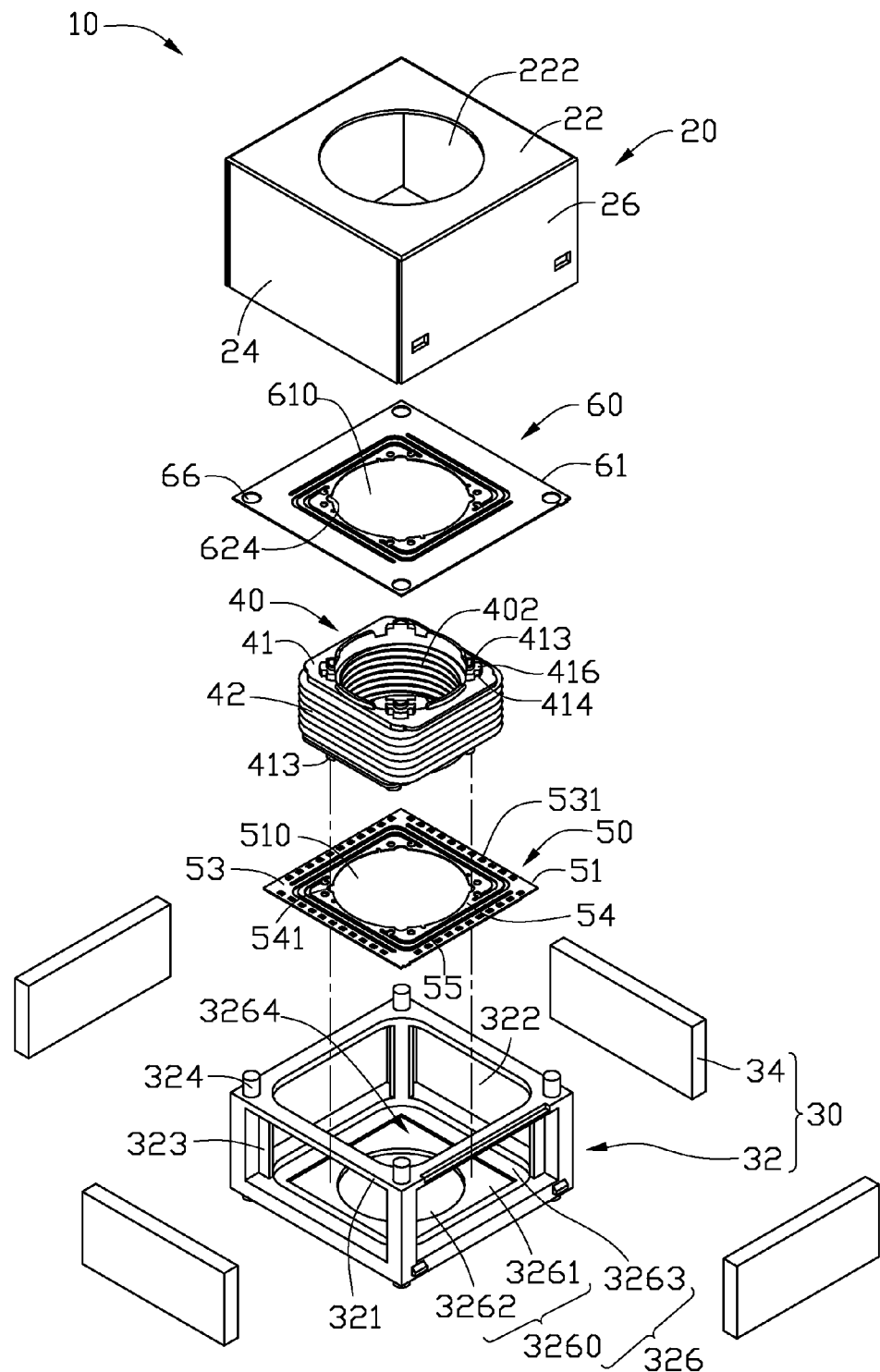
FIG. 2 is an exploded view of the lens actuator of FIG. 1, the lens actuator including a fixed unit, the fixed unit including a fixed panel with a counterbore defined therein.

Referring to FIGS. 1 and 2, a lens actuator 10, in accordance with a first embodiment, includes a housing 20, a fixed unit 30, a movable unit 40, a first resilient plates 50, and a second resilient plate 60.

The housing 20 includes a panel 22, a through hole 222 defined in the center of the panel 22, two opposite first peripheral panels 24 and two opposite second peripheral panels 26 respectively perpendicularly extending from four sides of the panel 22 and fastened to one another by use of dovetail panel joints (not shown). The panel 22, the first peripheral panels 24, and the second peripheral panels 26 cooperatively define a cavity for accommodating the fixed unit 30. It is understood that the housing 20 also can be cylinder shaped. The housing 20 is made of an electromagnetic shielding material, such as nickel alloy, conductive plastic, surface conductive material, conductive glass, etc.

The fixed unit 30 includes a cubic bracket 32 and a plurality of magnets 34. The bracket 32 includes a frame body 321 receivable in the housing 20. A first accommodation room 322 is defined in the frame body 321. Four magnet mounting holes 323 are respectively formed in four sides of the frame body 321. The magnet mounting holes 323 are in communication with the first accommodation room 322. Four first locating pins 324 are respectively vertically protruded from the top and bottom sides of the frame body 21 at each corner thereof. The first locating pins 324 are configured for fastening the top side of the bracket 32 to the second resilient plate 60. The number of the magnets 34 corresponds to that of the magnet mounting holes 323. The magnets 34 are respectively mounted in the magnet mounting holes 323.

Figure 3:
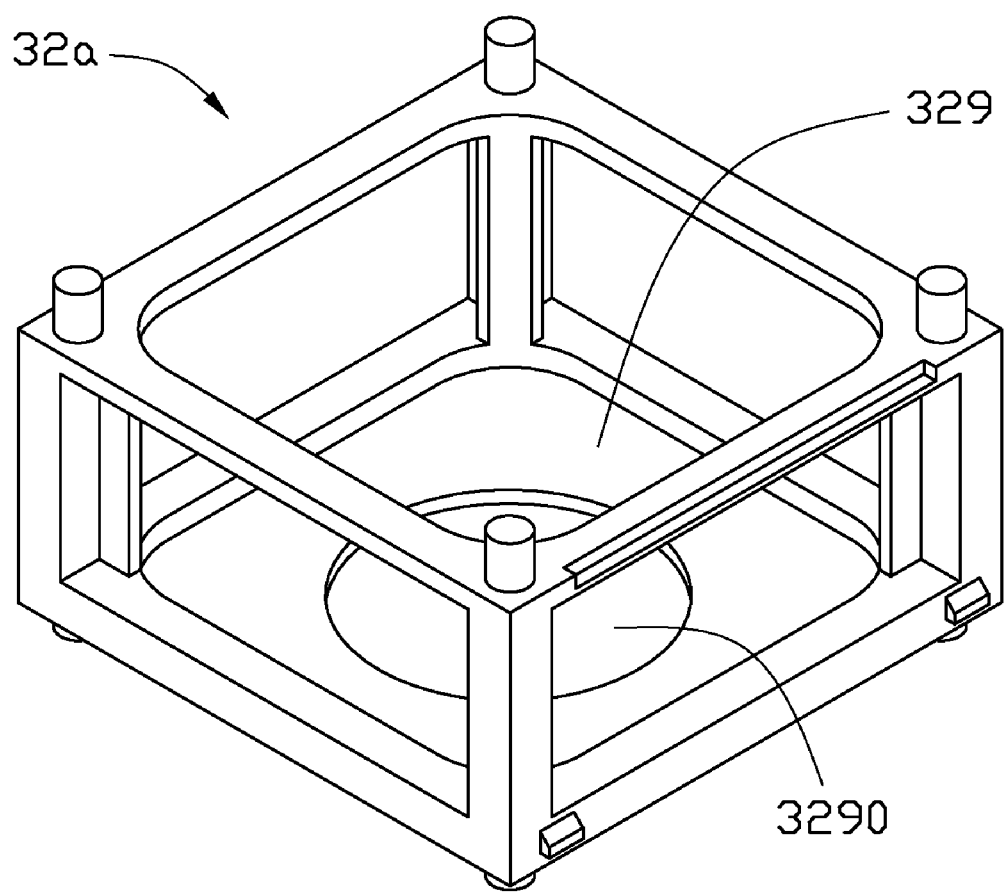
FIG. 3 is a schematic, isometric view of an alternative fixed unit including a flat fixed panel.

The fixed unit 30 further includes a fixed panel 326. The fixed panel 326 includes a main body 3263 and a counterbore 3260 defined in the center of the main body 3263. The counterbore 3260 includes a quadrate flat-bottomed hole 3261 having a flat bottom surface 3264 and a cylindrical through hole 3262 communicated with the quadrate flat-bottomed hole 3261. The quadrate flat-bottomed hole 3261 enlarges the cylindrical through hole 3262. In the exemplary embodiment, the counterbore 3260 is a shallow counterbore. The fixed panel 326 is mounted on the bottom side of the bracket 32 in a manner that the bottom surface 3264 of the quadrate flat-bottomed hole 3261 faces the first resilient plate 60. The fixed panel 326 also can be integrally formed with the frame body 321. The quadrate flat-bottomed hole 3261 also can be a cylindrical flat-bottomed hole corresponds to a disk shaped resilient plate. Referring to FIG. 3, in alternative embodiments, the fixed unit 30a can include a flat fixed panel 329 having a through hole 3290 defined in the central portion thereof.

Referring to FIG. 2, the movable unit 40 includes a lens barrel 41 and coils 42. The movable unit 40 is accommodated in the first accommodating room 323 of the bracket 32. The lens barrel 41 defines a second accommodating room 402 for accommodating the lenses and filters (not shown). The second accommodating room 402 is a through hole. Four convex stages 416 are respectively protruded from the top and bottom sides of the lens barrel 40 at each corner thereof. A second locating pin 413 is protruded out from the top surface of the each of the convex stage 416. The length of each second locating pin 413 is larger than the depth of the quadrate flat-bottomed hole 3261. Two grooves 414 are defined on the outer sidewall of each convex stage 416. The grooves 414 are configured for receiving an adhesive material therein. The second resilient plate 60 and the first resilient plate 50 are respectively glued (i.e., adhesively mounted) to the top and bottom sides of the lens barrel 41 by adhesive, so as to prevent the lenses or the filters from falling out of the lens barrel 41. The coils 42 are wrapped around the outside wall of the lens barrel 41.

The second resilient plate 60 comprises a plate shaped body 61. In the exemplary embodiment, the body 61 is substantially square shaped. The body 61 can also be disk shaped in alternative embodiments. A second through hole 610 for light passing therethrough is defined at the center of the body 61.

Cutouts or through holes 624 are defined around the edge of the second through hole 610 corresponding to the locating pins 413 on the top side of the lens barrel 41. The second resilient plate 60 is fastened to the top side of the lens barrel 41 by engagement of the cutouts or through holes 624 with the respective locating pins 413. Four holes 66, each corresponding to one of the first locating pins 324 are defined in the peripheral portion of the body 61. The second resilient plate 60 is fastened to the top or bottom side of the bracket 32 by engagement of the holes 66 with the corresponding distal ends of the first locating pins 324.

The first resilient plate 50 comprises a plate shaped body 51. In the exemplary embodiment, the body 51 is substantially square shaped. The body 51 can also be disk shaped in alternative embodiments. The body 51 includes an outer frame 53, an inner frame 54 coaxial with the outer frame 53, and a plurality of spring portions 55 interconnected between the outer frame 53 and the inner frame 54.

Cutouts or through holes 541 are defined around the inner edge of the inner frame 53 corresponding to the locating pins 413 of the lens barrel 41. The first resilient plate 50 is fastened to the bottom side of the lens barrel 41 by engagement of the cutouts or through holes 541 with the respective locating pins 413. Each of locating pins 413 inserts through the corresponding cutouts or through holes 541. The inner frame 54 of the first resilient plate 50 is glued to the surface of the convex stages 416 on the bottom sides of the lens barrel 40. A plurality of glue-holes 531 configured for receiving an amount of an adhesive are defined in the outer frame 53 of the first resilient plate 50. The outer frame 53 of the first resilient plate 50 is glued to the periphery portion of the main body 3263 of the fixed panel 326 by adding the adhesive in the glue-holes 523. The distal end of each locating pin 413 rests on the flat bottom surface 3264. Because the length of each second locating pin 413 is larger than the depth of the quadrate flat-bottomed hole 3261, the inner frame 54 is moved to a higher place than the place of the outer frame 53. As a result, the first resilient plate 50 may impart a pressure to the lens barrel 41, thus the lens barrel 41 can be stably fixed in the lens actuator 10 when the lens actuator 10 is in off work state. If a flat fixed panel 329 illustrated in FIG. 3 is applied, the distal end of each locating pin 413 direct rests on the flat fixed panel.

Figure 4:
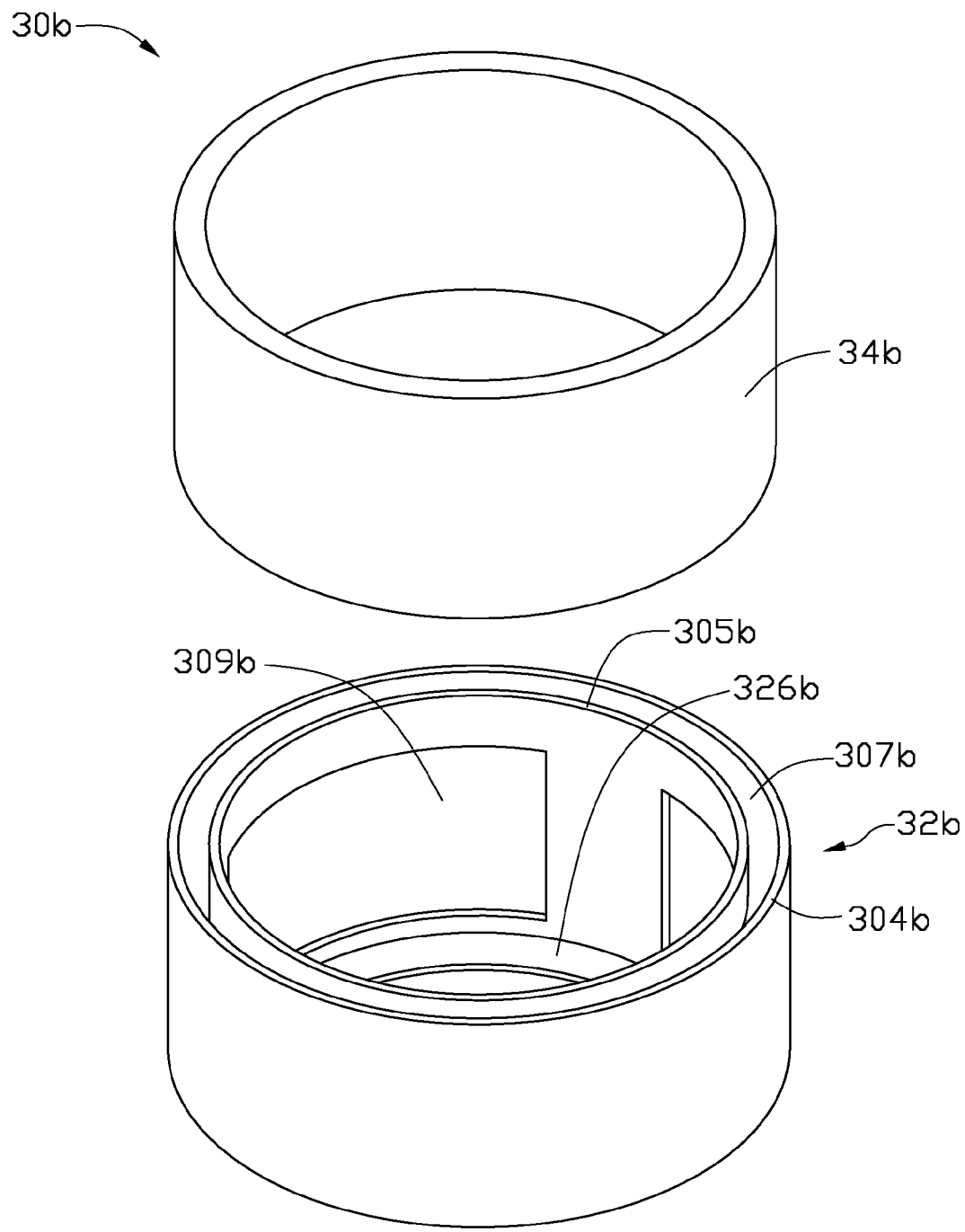
FIG. 4 is an exploded view of a fixed unit according to a second embodiment.

Referring to FIG. 4, a fixed unit 30b, in accordance with a second embodiment, includes a substantially cylinder shaped bracket 32b, a substantially cylinder shaped magnet 34b, and a fixed panel 326b mounted on the bottom side of the substantially cylinder shaped bracket 32b. The bracket 32b has an outer wall 304b, an inner wall 305b, and a slit 307b defined between the outer wall 304b and the inner wall 305b. The magnet 34b can be received in the slit 307b. A plurality of openings 309b is defined in the inner wall 305b. The structure of the fixed panel 326b is similar with that of the fixed panel 326 in the first embodiment, the difference is that the fixed panel 326b is disk shaped.

Figure 5:
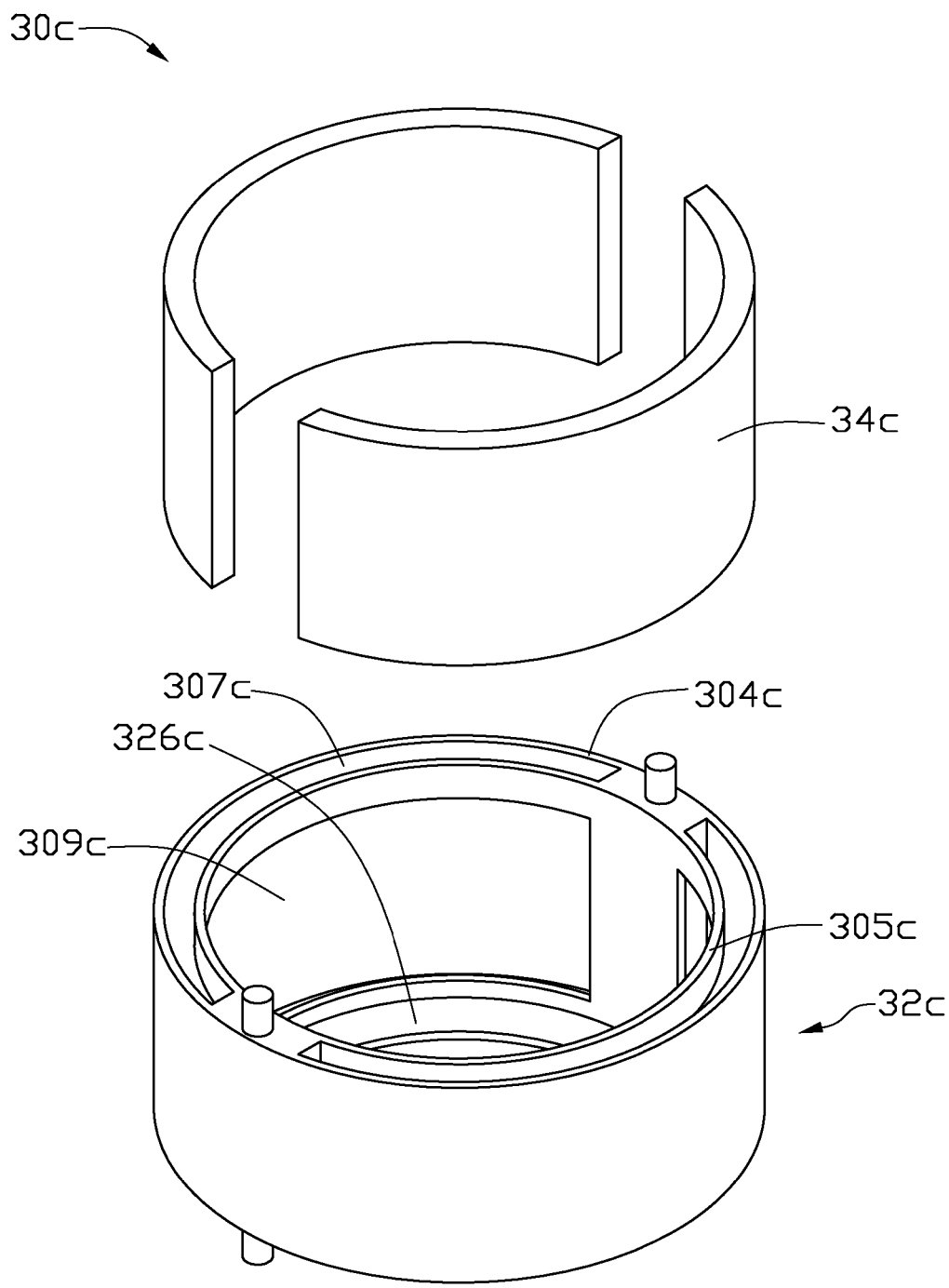
FIG. 5 is an exploded view of a fixed unit according to a third embodiment.

Referring to FIG. 5, a fixed unit 30c, in accordance with a third embodiment, includes a substantially cylinder shaped bracket 32c and two substantially arc shaped magnets 34c, and a fixed panel 326c mounted on the bottom side of the substantially cylinder shaped bracket 32c. The bracket 32c has an outer wall 304c, an inner wall 305c, and two substantially arc shaped slits 307c defined between the outer wall 304c and the inner wall 305c. Each magnet 34c can be received in the corresponding slit 307c. Two openings 309c are defined in the inner wall 305c. The position of each opening 309c spatially corresponds to the corresponding magnet 34c received in the slit 307c. The structure of the fixed panel 326c is similar with that of the fixed panel 326 in the first embodiment, the difference is that the fixed panel 326c is disk shaped.

Figure 6:
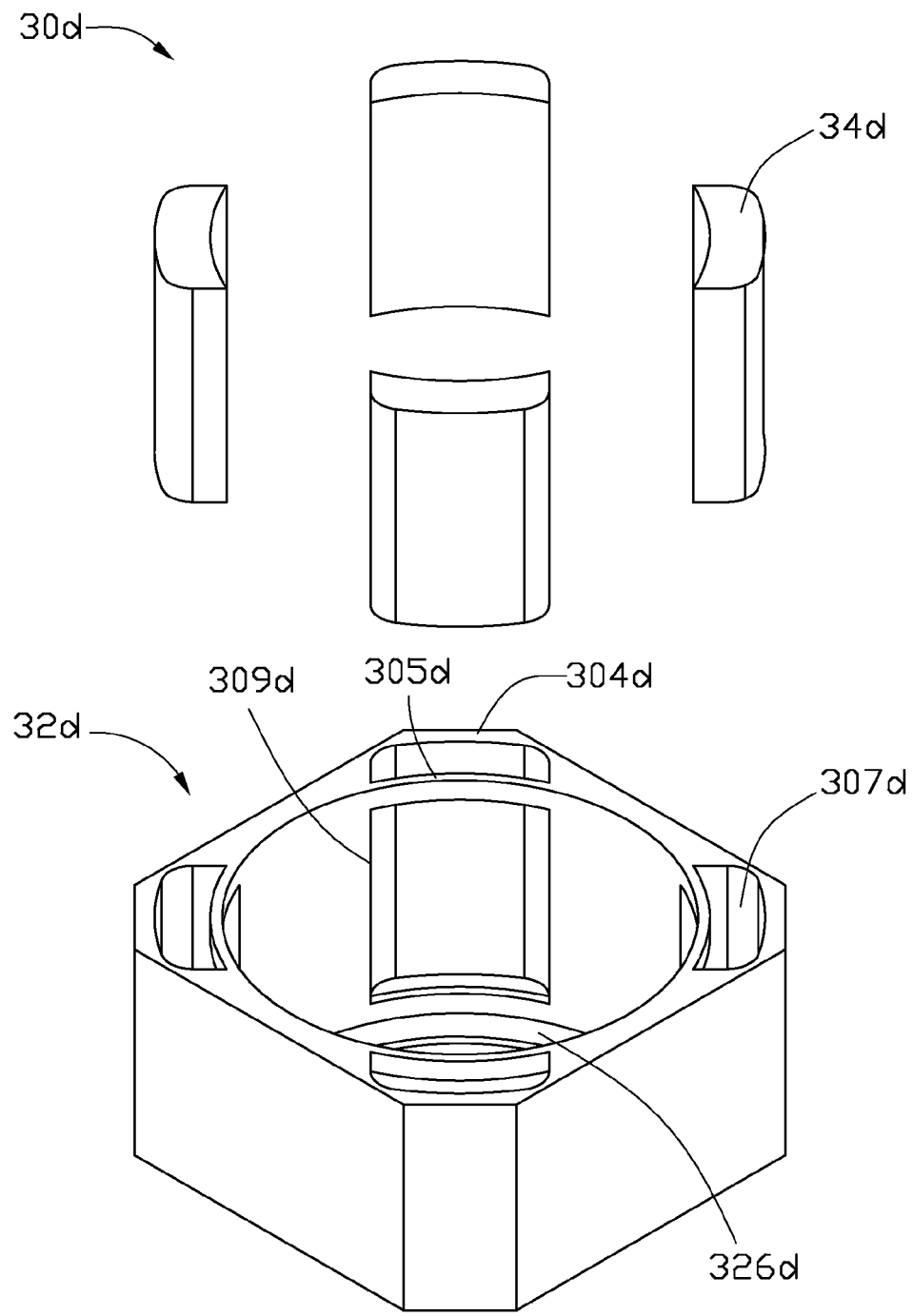
FIG. 6 is an exploded view of a fixed unit according to a fourth embodiment.

Referring to FIG. 6, a fixed unit 30d, in accordance with a fourth embodiment, includes a substantially cubic bracket 32d, four magnets 34d, and a fixed panel 326d mounted on the bottom side of the substantially cubic bracket 32d. The bracket 32d has an outer wall 304d, a cylindrical inner wall 305d, and four slits 307d defined at each corner of the bracket 32d. Each magnet 34d can be received in the corresponding slit 307d. Four openings 309d are defined in the inner wall 305d. The position of each opening 309d spatially corresponds to the corresponding magnet 34d received in the slit 307d. The structure of the fixed panel 326d is similar with that of the fixed panel 326 in the first embodiment, the difference is that the fixed panel 326d is disk shaped.

While certain embodiments have been described and exemplified above, various other embodiments will be apparent to those skilled in the art from the foregoing disclosure. The exemplary invention is not limited to the particular embodiments described and exemplified but is capable of considerable variation and modification without departure from the scope of the appended claims.

What is claimed is:

1. A lens actuator, comprising:
   a lens barrel comprising a main body and a plurality of first locating pins protruding out from the main body;
   a coil wrapped around the outside wall of the lens barrel;
   a plurality of magnets;
   a bracket for mounting the magnets thereon and accommodating the lens barrel therein, the bracket having a first side and an opposite second side;
   a first resilient plate comprising an outer frame, an inner frame substantially coaxial with the outer frame, and a plurality of spring portions interconnected between the outer frame and the inner frame; and
   a fixed panel mounted on the first side of the bracket;
   wherein the outer frame of the first resilient plate is fixed on one portion of the fixed panel, the inner frame of the first resilient plate is fixed on the lens barrel, the first locating pins extending through the inner frame of the first resilient plate and resting on another portion of the fixed panel.

2. The lens actuator of claim 1, wherein the fixed panel comprises a flat-bottomed hole defined in the central portion thereof, a through hole defined in the central portion of the flat-bottomed hole, the outer frame of the first resilient plate being fixed on the periphery portion of the fixed panel, and the distal end of at least one first locating pin resting on the flat bottom of the flat-bottomed hole in the fixed panel.

3. The lens actuator of claim 2, wherein the length of at least one of the first locating pins is larger than the depth of the flat-bottomed hole.

4. The lens actuator of claim 3, wherein a plurality of gluing holes are defined in the outer frame configured for receiving an adhesive material therein.

5. The lens actuator of claim 3, wherein the fixed panel is integrally formed with the bracket.

6. A lens actuator, comprising:
   a lens barrel for accommodating a lens;
   a coil wrapped around the lens barrel;
   a plurality of magnets;
   a bracket for mounting the magnets thereon and accommodating the lens barrel therein, the bracket having a first side and a second opposite side;
   a first resilient plate connected between the bracket and the lens barrel, the first resilient plate comprising an outer frame, an inner frame substantially coaxial with the outer frame, and a plurality of spring portions interconnected between the outer frame and the inner frame, the first resilient plate further comprising a plurality of cutouts defined in the inner edge of the inner frame of the first resilient plate, and a fixed panel mounted on the first side of the bracket, wherein a flat-bottomed hole is defined in the central portion of the fixed panel, a through hole is defined in the central portion of the flat-bottomed hole, and the outer frame of the first resilient plate is fixed on the periphery portion of the fixed panel.

7. The lens actuator of claim 6, wherein the lens barrel comprises a plurality of first locating pins corresponding to the cutouts and protruding out from the lens barrel, and the first resilient plate is fastened to the lens barrel by engagement of the cutouts with the respective first locating pins.

8. The lens actuator of claim 7, wherein the distal end of each first locating pin protrudes out from the cutouts of the first resilient plate.

9. The lens actuator of claim 8, wherein the distal end of at least one first locating pin rests on the flat bottom of the flat-bottomed hole in the fixed panel.

10. The lens actuator of claim 9, wherein the length of at least one of the first locating pins is larger than the depth of the flat-bottomed hole.

11. The lens actuator of claim 6, wherein a plurality of gluing holes are defined in the outer frame configured for receiving an adhesive material therein.

12. The lens actuator of claim 6, further comprising a second resilient plate connected between the bracket and the lens barrel and mounted on the second side of the bracket.

13. The lens actuator of claim 6, wherein the bracket comprises an outer wall, and an inner wall, the magnets sandwiched between the outer wall and the inner wall, the bracket including a plurality of openings defined in the inner wall with portions of each of the magnets exposed to an inside of the bracket via the respective openings.

14. The lens actuator of claim 13, wherein the bracket is substantially cylinder shaped, and the magnets are substantially arc shaped.

15. The lens actuator of claim 13, wherein the outer wall of the bracket is substantially cubic, the inner wall of the bracket is substantially cylinder shaped, and the magnets are arranged at respective four corners of the bracket.

16. A lens actuator, comprising:
a lens barrel comprising a main body and a plurality of first locating pins protruding out from the main body;
a coil wrapped around the lens barrel;
a plurality of magnets;
a bracket for mounting the magnets thereon and accommodating the lens barrel therein, the bracket having a first side and an opposite second side;
a first resilient plate comprising an outer frame, an inner frame substantially coaxial with the outer frame, and a plurality of spring portions interconnected between the outer frame and the inner frame; and
a fixed panel mounted on the first side of the bracket;
wherein the outer frame of the first resilient plate is fixed on one portion of the fixed panel, the inner frame of the first resilient plate is fixed on the lens barrel, the first locating pins extending through the inner frame of the first resilient plate and resting on another portion of the fixed panel, and the fixed panel being integrally formed with the bracket.

17. The lens actuator of claim 16, wherein the fixed panel is a flat fixed panel comprising a through hole defined in the central portion thereof, the outer frame of the first resilient being fixed on one portion of the flat fixed panel, and the distal end of at least one first locating pin resting on another portion of the flat fixed panel.

18. The lens actuator of claim 16, wherein the bracket comprises an outer wall, and an inner wall, the magnets sandwiched between the outer wall and the inner wall, the bracket including a plurality of openings defined in the inner wall with portions of each of the magnets exposed to an inside of the bracket via the respective openings.

19. The lens actuator of claim 18, wherein the bracket is substantially cylinder shaped, and the magnets are substantially arc shaped.

20. The lens actuator of claim 16, wherein a plurality of gluing hole is defined in the outer frame configured for receiving an adhesive material therein.

* * * * *